United States Patent [19]
Koishi

[11] Patent Number: 5,420,690
[45] Date of Patent: May 30, 1995

[54] OPTICAL INFORMATION RECORDING/REPRODUCING APPARATUS

[75] Inventor: Kenji Koishi, Takarazuka, Japan

[73] Assignee: Matsushita Electric Industrial Co., Ltd., Osaka, Japan

[21] Appl. No.: 278,101

[22] Filed: Jul. 20, 1994

Related U.S. Application Data

[63] Continuation of Ser. No. 907,842, Jul. 2, 1992, abandoned.

[30] Foreign Application Priority Data

Jul. 4, 1991 [JP] Japan ................. 3-164306

[51] Int. Cl.$^6$ .......................................... H04N 5/782
[52] U.S. Cl. ..................... 358/342; 369/84; 360/15
[58] Field of Search ............... 358/342, 310, 335, 322; H04N 5/76, 5/782, 5/92; 369/48, 50, 49, 109, 111, 32, 124, 84; 360/15

[56] References Cited

U.S. PATENT DOCUMENTS

| | | | |
|---|---|---|---|
| 4,251,830 | 2/1981 | Tatami | 360/10 |
| 4,416,002 | 11/1983 | Ognino et al. | 358/342 |
| 4,449,212 | 5/1984 | Reno | |
| 4,788,671 | 11/1988 | Kanda | 369/14 |
| 4,829,497 | 5/1989 | Sako et al. | 369/48 |
| 5,001,570 | 3/1991 | Tagawa | 358/342 |
| 5,181,161 | 1/1993 | Hirose et al. | 369/48 |
| 5,200,944 | 4/1993 | Souma | 369/48 |

FOREIGN PATENT DOCUMENTS

| | | |
|---|---|---|
| 0019378A1 | 11/1980 | European Pat. Off. |
| 0082077A1 | 6/1983 | European Pat. Off. |
| 0152142A3 | 8/1985 | European Pat. Off. |
| 0312406A3 | 4/1989 | European Pat. Off. |
| 0381807A3 | 8/1990 | European Pat. Off. |
| 49-79619 | 8/1974 | Japan |
| 60-61941 | 4/1985 | Japan |
| 62-084441 | 4/1987 | Japan |

*Primary Examiner*—Tommy Chin
*Assistant Examiner*—Thai Tran
*Attorney, Agent, or Firm*—Wenderoth, Lind & Ponack

[57] ABSTRACT

An optical recording and/or reproducing apparatus is operable to transmit at a high speed a long-play program comprising video and/or audio signals and has a capability of recording the program during a playback mode at a normal reproducing speed of the program. At a transmitter side, a digital data of the program is divided on a time-sharing basis and is then reproduced from an optical disc at a high transfer rate simultaneously with a plurality of channels of optical read/write heads so that, when the digital data is transmitted, the length of time during which the transmission occupies a transmission line can be reduced. On the other hand, at a receiver side, the transmitted signals are recorded on the optical disc at a high transfer rate simultaneously using plural channels of optical read/write heads. When a subscriber wishes to view the program, only one channel of the optical head is used to sequentially reproduce the data at the normal reproducing speed to reproduce the program while maintaining the sequence and speed of the original program. In this way, an optical recording and/or reproducing apparatus capable of reducing the time during which the transmission occupies the transmission line can be realized.

3 Claims, 4 Drawing Sheets

OPTICAL INFORMATION RECORDING/REPRODUCING APPARATUS

This application is a continuation of now abandoned application, Ser. No. 07/907,842, filed Jul. 2, 1992.

BACKGROUND OF INVENTION

1. Field of the Invention

The present invention generally relates to an optical information recording and/or reproducing apparatus and, more particularly, to an optical disc player for recording or reproducing a video signal and/or an audio signal on or from an optical disc medium.

2. Description of the Prior Art

The prior art optical information recording and/or reproducing apparatus, or an optical disc player for short, for selectively recording or reproducing information, such as one or a combination of video and audio signals, on or from an optical disc, respectively, is generally designed to have a record transfer rate equal to a playback transfer rate. In other words, in the prior art optical disc player, the speed at which information are recorded on an optical disc by means of an optical recording/reproducing head during a recording mode, that is, the record transfer rate, is equal to the speed at which information are reproduced from an optical disc by means of an optical recording/reproducing head during a playback mode, that is, the playback transfer rate. Accordingly, the structure of recording channels and the speed of rotation of the optical disc during the recording mode are identical with those during the playback mode.

The prior art optical disc player has, however, a problem in that, after a long-play program such as, for example, one or both of long-play video and audio signals, have been recorded on an optical disc in a short space of time, the recorded long-play program cannot be reproduced at a normal speed of reproduction of the program. By way of example, where a relatively small number of sample optical discs are prepared, they will not be prepared by the use of a stamper, and it often occurs that information is recorded on the recordable optical discs. In this case, since in the case of a long-play program such as one or a combination of the video and audio signals the time required to accomplish the recording of such a long-play program must be equal to that required to accomplish the playback of such a long-play program, the preparation of the sample optical discs requires a substantial length of time.

Also, even where a viewer or subscriber of a cable television system selects one of video and/or audio programs for reproduction thereof, the programs must be transmitted at a high speed. While it is a recent trend to increasingly substitute optical fiber cables for wirings for television transmission, the speed of transmission of information through the optical fiber cable is sufficiently higher than the playback transfer rate of the optical disc during the playback mode and the video and/or audio program can be transmitted in a short space of time. Unless the program is transmitted at a high speed comparable to the speed of transmission of information through the optical fiber cable, the transfer rate of the optical disc during the recording or playback mode will impose a limitation on the speed of transmission of the information.

SUMMARY OF THE INVENTION

Accordingly, the present invention has been devised to eliminate the foregoing problems inherent in the prior art optical disc player and is intended to provide an improved optical disc player of a structure and capable of transmitting a long-play video and/or audio program at a high speed and reproducing the program at a normal speed during a playback mode.

In order to accomplish the above described object, a transmitter side from which a program comprising video and/or audio signals are transmitted comprises a high transfer rate reproducing means for time-sharing a continuous program comprising video and/or audio signals to be reproduced into a plurality of program segments equal to a number of N channels (N being an integer), for reproducing the N-channel program segments simultaneously from an optical disc and for transmitting the reproduced digital data to a transmission line so that the length of time the transmission of the digital data occupies the transmission line can be reduced.

When the program comprising the video and/or audio signals is to be recorded, a low transfer rate recording means is utilized to record the digital data referred to above sequentially on the optical disc, having the digital data divided into the N-channel program segments on a time-sharing basis, sequentially without being jumped, so that the digital data can be recorded while maintaining the sequence of the program before being time-shared.

On the other hand, a receiver side for receiving and reproducing the program comprising the video and/or audio signals comprises a high transfer rate recording means for receiving the digital data of the program from the transmission line and for recording the N-channel program segments by time-sharing the digital data into N channels so that the length of time the transmission of the digital data occupies the transmission line can be reduced, and a low transfer rate reproducing means for sequentially reproducing M-channels at a time the digital data recorded on the optical disc, and divided into the N-channel program segments on a time-sharing basis, so that the digital data can be recorded while maintaining the sequence of the program before being time-shared.

With the foregoing construction, after the long-play video and/or audio program has been recorded on the optical disc in a short space of time using a simplified structure, the playback of the recorded program can be effected at the same normal reproducing speed as used for reproducing the original program. Therefore, the length of time during which the transmission of the program occupies the transmission line can advantageously be reduced. Therefore, the transmitter side can make the transmission line available to other subscribers, making it possible to maximize the use of the transmission line. On the other hand, the receiver side can reduce the time required to connect with the transmission line, making it possible to reduce the cost incurred by the utilization of the transmission line.

BRIEF DESCRIPTION OF THE DRAWINGS

These and other objects and features of the present invention will become clear from the following description taken in conjunction with a preferred embodiment thereof with reference to the accompanying drawings, in which like parts are designated by like reference numerals and in which.

DETAILED DESCRIPTION OF THE PREFERRED EMBODIMENT

Figure 3:
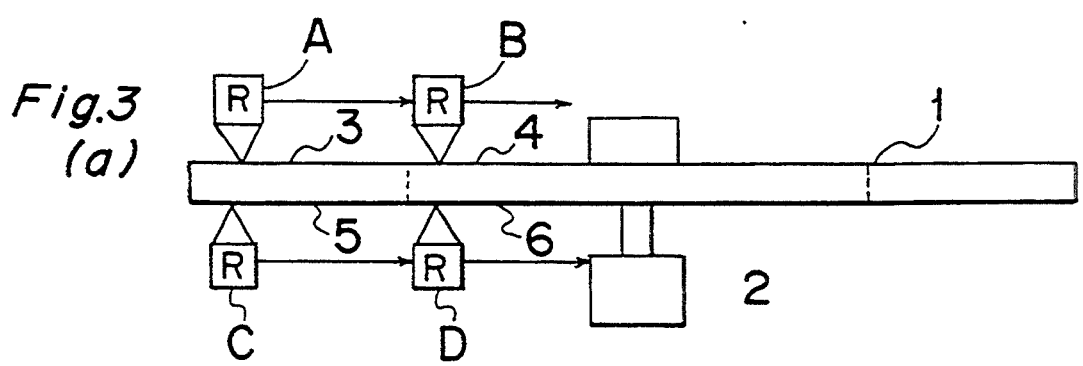
FIGS. 3(a)–3(c) are schematic diagrams showing the optical heads that can be employed in the optical disc player according to the present invention.
Figure 3:
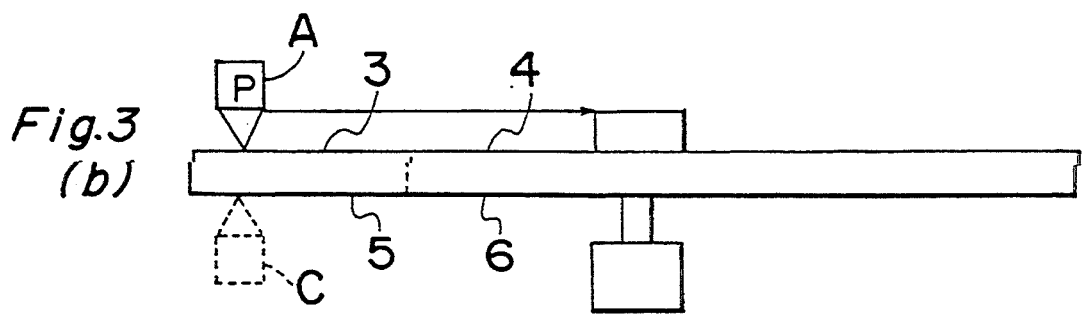
Figure 3:
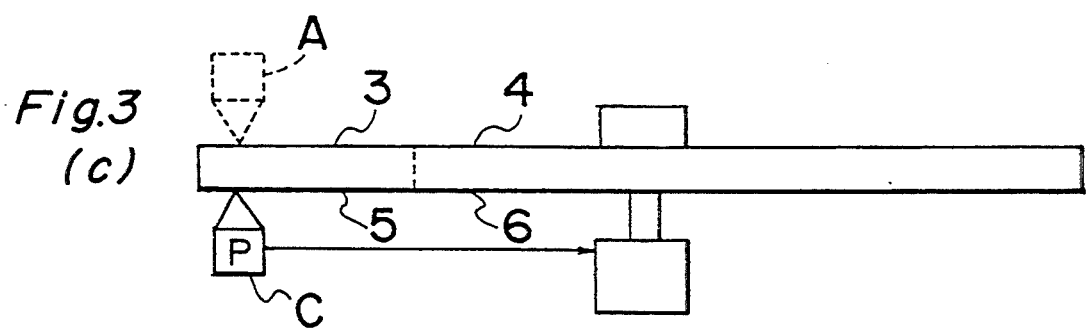

FIGS. 3(a)–3(c) illustrate a structure of an optical disc player according to a preferred embodiment of the present invention. An optical disc, identified by 1, is adapted to be driven by a disc motor 2 for rotation in one direction about an axis of a motor drive shaft at a predetermined speed appropriate to a recording or playback of information on or from the optical disc 1. Reference characters A and B represent optical read/write heads disposed above the optical disc 1 for recording or reproducing information on or from A and B channels on an upper surface of the optical disc, respectively, whereas reference characters C and D represent optical read/write heads disposed beneath the optical disc 1 for recording or reproducing information on or from C and D channels on a lower surface of the optical disc 1, respectively. It is to be noted that the status of operation of each of the optical read/write heads A to D (i.e., either a recording mode or a playback mode) is shown by a small reference character depicted within the framework of a schematic representation of the associated optical read/write head A to D, wherein R and P represent the recording mode and the playback mode, respectively.

FIG. 3(a) illustrates the system in a high transfer rate recording operation in which information transmitted at a high transfer rate is multi-channel recorded on the optical disc 1. As shown therein, the optical read/write heads A to D are all in the recording mode to accomplish the multi-channel recording of the information transmitted at the high transfer rate. A program consisting of a series of video and/or audio signals are, in this instance, divided into four channel segments which are simultaneously recorded on the optical disc 1 by means of the associated optical read/write heads A to D by modulating light beams emerging therefrom.

Figure 4:
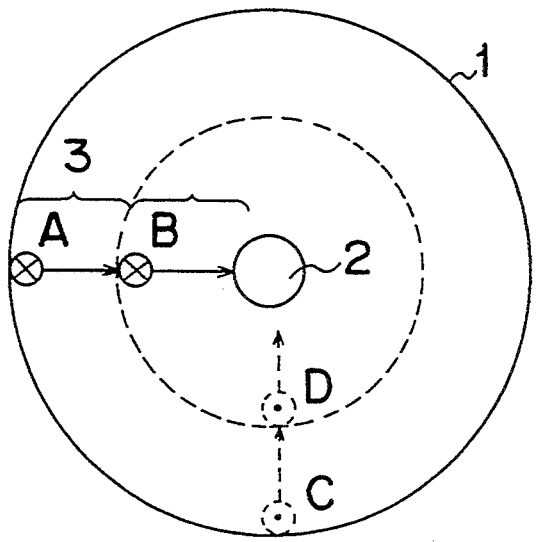
FIG. 4 is a schematic diagram showing a relationship between the optical disc and the optical heads.

FIG. 4 illustrates the optical disc 1 shown in FIG. 3(a) as viewed from above. The optical read/write heads A and B are oriented downwards, as viewed in FIG. 3(a), so as to direct respective beams of light downwards towards the upper surface of the optical disc 1, whereas the optical read/write heads C and D are oriented upwards so as to direct respective beams of light upwardly towards the lower surface of the optical disc 1. The optical read/write head A is used to record a first data of the video and/or audio program, which has been divided into four segments, on an outer peripheral portion 3 of the upper surface of the optical disc 1; the optical read/write head B is used to record a second data of the video and/or audio program, which has been divided into the four segments, on an inner peripheral portion of the upper surface of the optical disc 1; the optical read/write head C is used to record a third data of the video and/or audio program, which has been divided into the four segments, on an outer peripheral portion 5 of the lower surface of the optical disc 1; and the optical read/write head D is used to record a fourth data of the video and/or audio program, which has been divided into the four segments, on an inner peripheral portion of the lower surface of the optical disc 1. By recording the information on the four channels on the optical disc simultaneously, the program consisting of the video and/or audio signals can be recorded on the optical disc 1 at a high speed.

FIGS. 3(b) and 3(c) illustrate the system in a low transfer rate playback operation in which information recorded on the optical disc 1 is reproduced at a low transfer rate, i.e., on a single channel basis. Specifically, FIG. 3(b) illustrates a condition in which only one channel of the optical read/write head A above the optical head 1 is used to reproduce information from the outer and inner peripheral portions 3 and 4 of the upper surface of the optical disc 1. In this case, accordingly, the optical read/write head A reproduces continuously the first and second data of the four-divided program at a normal reproducing speed equal to that of the original program.

Similarly, as shown in FIG. 3(c), only one channel of the optical read/write head C beneath the optical head 1 is used to reproduce information from the outer and inner peripheral portions 5 and 6 of the lower surface of the optical disc 1. Accordingly, the optical read/write head C reproduces continuously the third and fourth data of the four-divided program at a normal reproducing speed equal to that of the original program.

Thus, if the information recorded on the upper and lower surfaces of the optical disc 1 as shown in FIGS. 3(b) and 3(c), respectively, are continuously reproduced in sequential fashion without the reproduced information being interrupted, the four-divided program segments can be reproduced in a sequence identical with that of the original video and/or audio program at a normal reproducing speed.

As a matter of course, if the number of revolutions per unit time of the disc motor 2 during the recording mode is X times that during the playback mode (X being an integer), a high transfer rate of 4 X can be realized.

Figure 5:
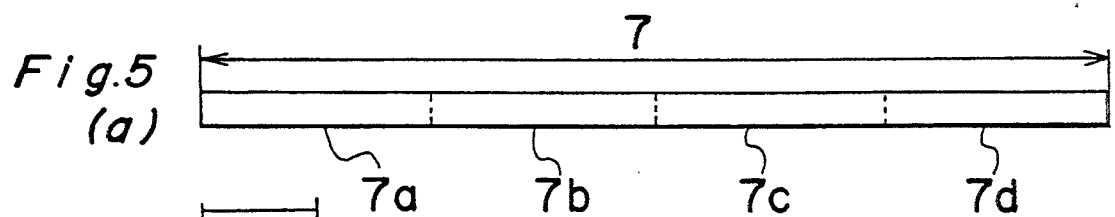
FIGS. 5(a)–5(c) are a timing chart showing the sequence of operation of the optical heads shown in FIG. 5.
Figure 5:
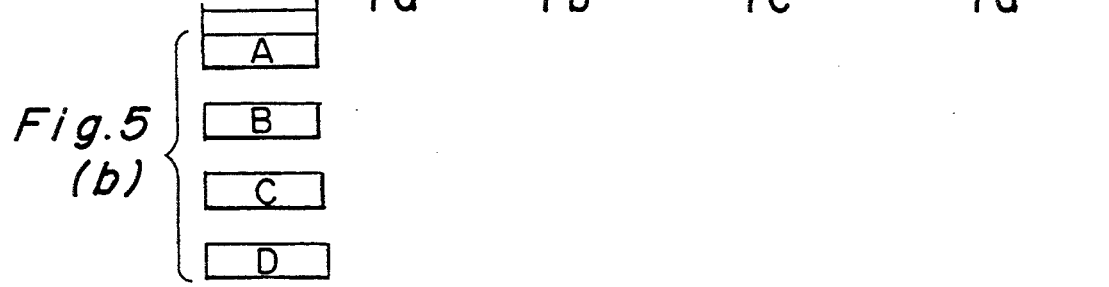
Figure 5:
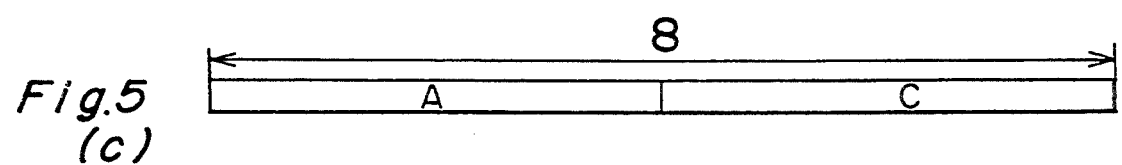

FIGS. 5(a)–5(c) illustrate the operation of the optical read/write heads when the number of revolutions of the disc motor 2 during the recording mode is chosen to be twice that during the playback mode. It is to be noted that the operation shown in FIG. 5(b) corresponds to that shown in FIG. 3(a) and the operation shown in FIG. 5(c) corresponds to that shown in each of FIGS. 3(b) and 3(c). The length of time required to reproduce the program consisting of the video and/or audio signals during the normal playback mode is indicated by 7. As shown in FIG. 5(a), this video and/or audio program is divided into four program segments 7a, 7b, 7c and 7d. Then, as shown in FIG. 5(b), the four program segments 7a to 7d are recorded on the optical disc 1 by means of the respective optical read/write heads A to D. Since in this case the number of revolutions of the disc motor 2 during the recording mode is chosen to be twice that during the playback mode, the instance of FIG. 5(b) makes it possible to record the program as a whole at a speed (r bits per second) which is equal to eight times the normal reproducing speed (p bits per second).

FIG. 5(c) illustrates a condition in which the program segments 7a and 7b are reproduced from the upper surface of the optical disc 1 by means of the optical read/write head A at the normal reproducing speed whereas the program segments 7c and 7d are reproduced from the lower surface of the optical disc 1 by means of the optical read/write head C at the normal reproducing speed. Accordingly, the total time 8 required for the optical read/write heads A and C to reproduce the program segments 7a to 7d is equal to the length of time 7 required to reproduce the original program.

While the description made with reference to each of FIGS. 3(a)–3(c) and 5(a)–5(c) where the information is recorded at the high transfer rate or the information is reproduced at the low transfer rate, respectively, the respective status of operation of the optical read/write heads A to D, shown by R and P in FIG. 3(a), may be reversed and the respective status of operation of the optical read/write heads A and C, shown by P in FIGS. 3(b) and 3(c) may be reversed. In such case, the information can be reproduced at a high transfer rate and recorded at a low transfer rate.

Figure 1:
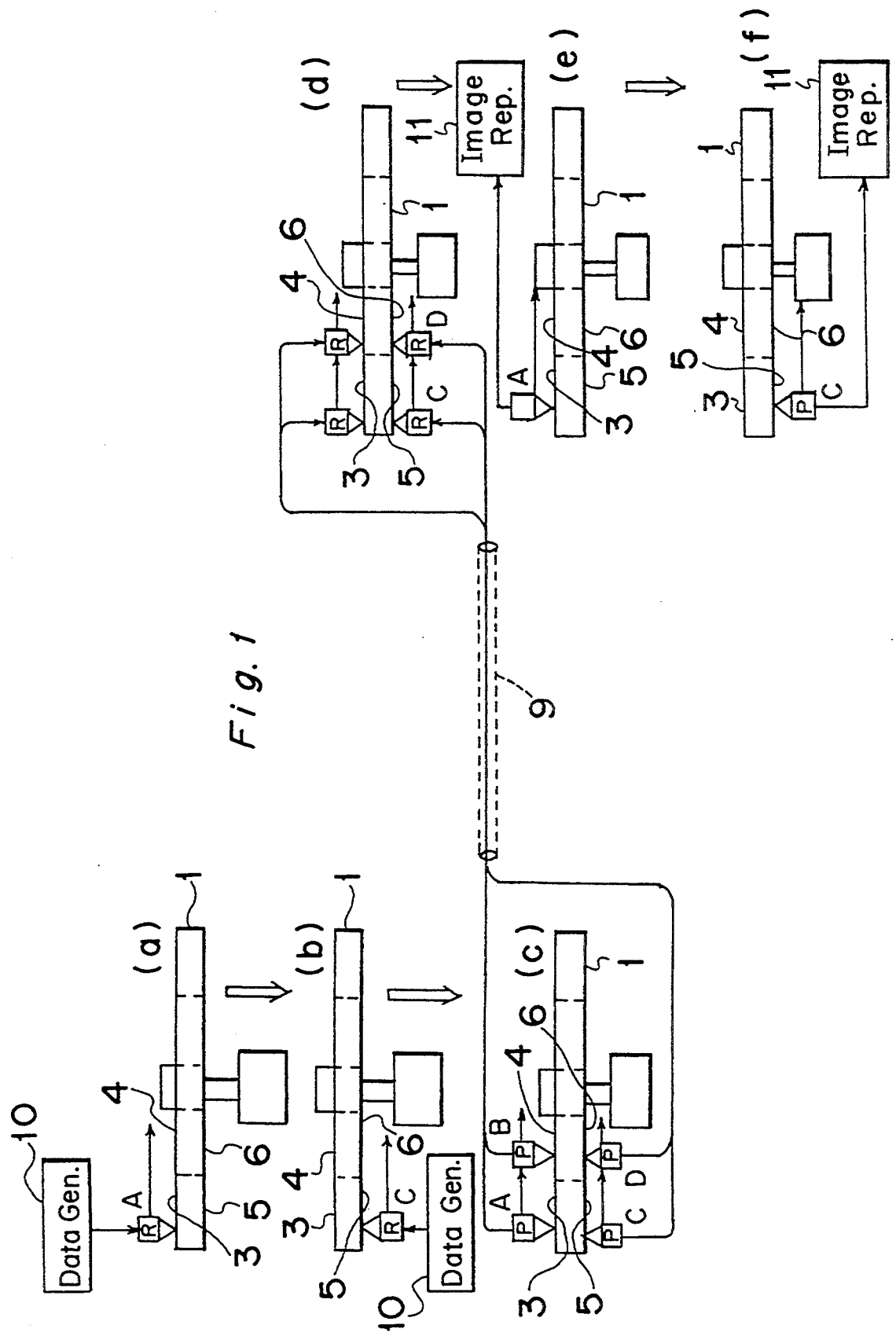
FIG. 1 is a schematic diagram showing a transmission system for transmitting video and/or audio signals in one embodiment of an optical disc player.

FIG. 1 illustrates an embodiment in which a number of the optical disc players of the present invention are combined together to transmit a long-play program consisting of video and/or audio signals at a high speed through a cable television transmission system. Referring to FIG. 1, the video and/or audio program is transmitted at a high speed through a transmission line 9 which may comprise an optical fiber. FIGS. 1(a), 1(b) and 1(c) illustrate a system set-up and an operation of the optical disc player on a transmitter side whereas FIGS. 1(d), 1(e) and 1(f) illustrate a system set-up and an operation of the optical disc player on a receiver side.

Figure 2:
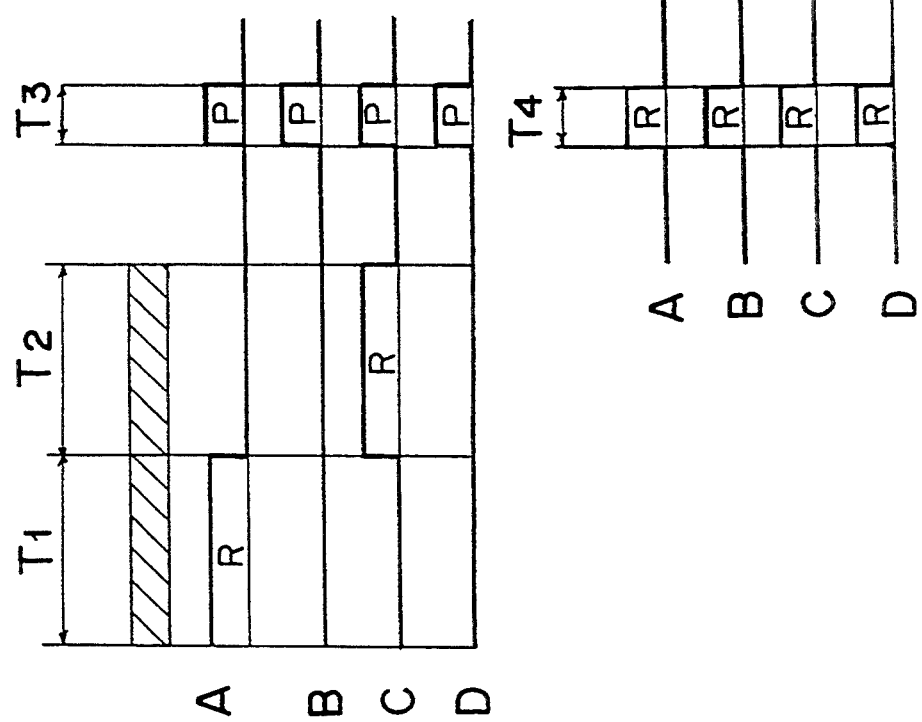
FIG. 2 is a timing chart showing a relationship among various optical heads employed in the apparatus shown in FIG. 1.

On the other hand, intervals T1, T2, T3, T4, T5 and T6 shown in FIG. 2 correspond to recording and playback timings of the optical read/write heads held in respective states (either recording or playback modes) shown in FIGS. 1(a) to 1(f). As is the case with FIG. 1, the characters R and P represent the recording and playback modes of the optical read/write heads.

A signal outputted from a data generator 10 for video and/or audio signals is utilized to modulate a beam of light emitted from the respective optical read/write head. In the first place, as shown in FIG. 1(a), the first and second program segments 7a and 7b of the original program 7 are entirely recorded on the upper surface of the optical disc 1 using only one channel, i.e., the optical read/write head A. The recording timing is shown by T1 in FIG. 2.

Thereafter, a signal outputted from the data generator 10 is used to cause the third and fourth program segments 7c and 7d of the original program 7 to be recorded entirely on the lower surface of the optical disc using only one channel, i.e., the optical read/write head C. The recording timing is shown by T2 in FIG. 2.

In this way, the program of the video and/or audio signals are recorded on both surfaces of the optical disc 1, and the optical disc 1 having a number of video and/or audio programs recorded thereon is stored at the transmitter side.

The optical disc 1 having the programs recorded thereon and stored at the transmitter side may include not only those recorded according to the operation described with reference to FIGS. 1(a) and 1(b), but also those which have been recorded with the use of any other recording apparatus or those which have been duplicated by means of any known method using a stamper.

In the event that a subscriber selects a particular one of the programs and requests that it should be transmitted through the transmission line 9, the optical read/write head A reproduces, as shown in FIG. 1(c), the first data of the video and/or audio program, which has been divided into the four program segments, from the outer peripheral portion 3 of the upper surface of the optical disc 1. At the same time, the optical read/write head B reproduces the second data of the four-divided program from the inner peripheral portion 4 of the upper surface of the optical disc 1; the optical read/write head C reproduces the third data of the four-divided program from the outer peripheral portion 5 of the lower surface of the optical disc 1; and the optical read/write head D reproduces the third data of the four-divided program from the inner peripheral portion 6 of the lower surface of the optical disc 1. By reproducing the four channels simultaneously in this way, the video and/or audio program can be reproduced and transmitted at a high speed. In the example shown by T3 in FIG. 2, the program is reproduced and transmitted at a speed which is eight times the normal reproducing speed.

On the other hand, the operation of the optical disc player owned by a cable television subscriber, which receives and records the video and/or audio program transmitted at a high speed through the transmission line 9, is shown in FIG. 1(d). As shown therein, the optical read/write head A records the first data of the divided video and/or audio program, which has been transmitted through the transmission line 9, on the outer peripheral portion 3 of the upper surface of the optical disc 1. At the same time, the optical read/write head B records the second data of the divided program on the inner peripheral portion 4 of the upper surface of the optical disc 1; the optical read/write head C records the third data of the divided program on the outer peripheral portion 5 of the lower surface of the optical disc 1; and the optical read/write head D records the third data of the divided program on the inner peripheral portion 6 of the lower surface of the optical disc 1. By recording the four channels simultaneously in this way, the video and/or audio program can be recorded on the optical disc at a high speed. In the example shown by T4 in FIG. 2, the program is received and recorded at a speed which is eight times the normal reproducing speed, completing a recording in a short space of time of one or some of the programs transmitted through the transmission line 9.

Thus, it will readily be seen that if the subscriber makes a recording of some of the transmitted programs which he or she wishes to view, he or she can look them at any time by reproducing the programs at the normal reproducing speed.

FIG. 1(e) illustrates a condition in which using only one channel, i.e., the optical read/write head A, information recorded on the outer and inner peripheral portions 3 and 4 of the upper surface of the optical disc 1 is reproduced. In this condition, the optical read/write head A reproduces the first and second data of the divided program continuously and at the same normal reproducing speed as used for reproducing the original program. The operational timing is shown by T5 in FIG. 2. The reproduced data are inputted to an image data processing and reproducing device 11 so that the subscriber can view the program reproduced at the normal reproducing speed.

Similarly, FIG. 1(f) illustrates a condition in which using only one channel, i.e., the optical read/write head C, information recorded on the outer and inner peripheral portions 5 and 6 of the lower surface of the optical disc 1 is reproduced. In this condition, the optical read/write head C reproduces the third and fourth data of the four-divided program continuously and at the same normal reproducing speed as used for reproducing the original program. The operational timing is shown by T6 in FIG. 2. The reproduced data are inputted to the image data processing and reproducing device 11 so that the subscriber can view the program reproduced at the normal reproducing speed.

Thus, if the information recorded on the upper and lower surfaces of the optical disc 1 as shown in FIGS. 1(e) and 1(f), respectively, are continuously reproduced in sequential fashion without the reproduced information being interrupted, the divided program segments can be reproduced in a sequence identical with that of the original video and/or audio program at the normal reproducing speed 8.

With the construction described above, after the long-play video and/or audio program has been recorded on the optical disc in a short space of time using a simplified structure, the playback of the recorded program can be effected at the same normal reproducing speed as used for reproducing the original program. Therefore, the length of time during which the transmission of the program occupies the transmission line can advantageously be reduced. Therefore, the transmitter side can make the transmission line available to other subscribers, making it possible to maximize the use of the transmission line. On the other hand, the receiver side can reduce the time required to connect with the transmission line, making it possible to reduce the cost incurred by the utilization of the transmission line.

In other words, where a cable television subscriber selects and reproduces the video and/or audio program, the program can be transmitted at a high speed and in a short length of time and can, when being reproduced, be reproduced at the normal reproducing speed, and therefore, a cable television system by which subscribers can enjoy viewing programs can be realized.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention, as defined by the appended claims, unless they depart therefrom.

What is claimed is:

1. A video on-demand system comprising a receiver-side optical disk recording and reproducing apparatus and a transmitter-side optical disk recording and reproducing apparatus interconnected by a data transmission line, said transmitter-side optical disk recording and reproducing apparatus comprising:

(a) a low transfer rate recording means having an optical recording head for recording a digital program onto a first optical disk at a data record transfer rate of r bits per second, wherein r is a positive number and wherein the digital program denotes at least one of video signals, audio signals and video game software, said low transfer rate recording means including means for sequentially modulating a beam of light from the optical recording head on N divided surface regions of opposite surfaces of the first optical disk in accordance with the digital program to sequentially record N portions of the digital program at the respective N divided surface regions of the opposite surfaces of the first optical disk, wherein N is an integer greater than 1;

(b) a high transfer rate reproducing means having N optical reproducing heads for simultaneously reproducing the recorded N portions of the digital program from the respective N divided surface regions of the first optical disk at a data playback transfer rate of p bits per second, wherein p is a positive number which is greater than r, said high transfer rate reproducing means including means for simultaneously applying N reproduction light beams respectively from said N optical reproducing heads to the respective N divided surface regions of the opposite surfaces of the first optical disk to simultaneously reproduce the recorded N portions of the digital program, wherein a ratio of a time for recording the digital program data by said low transfer rate recording means to a time for reproducing the digital program by said high transfer rate reproducing means is p/r; and (c) means for transmitting the digital program reproduced by said high transfer rate reproducing means on the data transmission line at a rate of p bits per second;

said receiver-side optical disk recording and reproducing apparatus comprising:

(a) means for receiving the digital program from the data transmission line at a rate of r' bits per second, where p=r';

(b) a high transfer rate recording means having N' optical recording heads for recording the digital program onto a second optical disk at a data record transfer rate of r' bits per second, said high transfer rate recording means including means for simultaneously modulating N' beams of light respectively from said N' optical recording heads on the second optical disk in accordance with the digital program to simultaneously record N' portions of the digital program at respective N' divided surface regions of opposite surfaces of the second optical disk, wherein N' is an integer greater than 1; and, (c) a low transfer rate reproducing means having an optical reproducing head for sequentially reproducing the recorded N' portions of the digital program from the respective N' divided surface regions of the second optical disk at a data playback transfer rate of p' bits per second during a normal reproduction mode, wherein p' is a positive number which is less than r', said low transfer rate reproducing means including means for sequentially applying a reproduction light beam from said reproducing optical head to the N' divided surface regions of the opposite surfaces of the second optical disk to sequentially reproduce the recorded N' portions of the digital program, wherein a ratio of a time for reproducing the digital program data by said low transfer rate reproducing means to a time for recording the digital program by said high transfer rate recording means is r'/p'.

2. An apparatus as claimed in claim 1, wherein said low transfer rate recording means includes means for rotating the optical disk at a third rotation rate A' during recording of the digital program at the data record transfer rate of r bits per second, and wherein said high transfer rate reproducing means includes means for rotating the optical disk at a fourth rotation rate B' during reproduction of the digital program at the data reproduction transfer rate of p bits per second, wherein the third rotation rate A' is slower than the fourth rotation rate B'; and wherein said high transfer rate recording means includes means for rotating the optical disk at a first rotation rate A' during recording of the digital program at the data record transfer rate of r' bits per second, and wherein said low transfer rate reproducing means includes means for rotating the optical disk at a second rotation rate B' during reproduction of the digital program at the data reproduction transfer rate of p' bits per second, wherein the first rotation rate A' is faster than the second rotation rate B'.

3. A system as claimed in claim 2, wherein the ratio of r/p is equal to N times A/B, and wherein the ratio of p'/r' is equal to N' times B'/A'.

* * * * *